(12) United States Patent
Schaale

(10) Patent No.: US 10,746,877 B2
(45) Date of Patent: Aug. 18, 2020

(54) FUNCTIONAL SAFETY CONCEPT FOR A 3D INTERIOR OBSERVATION CAMERA

(71) Applicant: ZF Friedrichshafen AG, Friedrichshafen (DE)

(72) Inventor: Christian Schaale, Weißensberg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/368,437

(22) Filed: Mar. 28, 2019

(65) Prior Publication Data

US 2019/0302260 A1   Oct. 3, 2019

(30) Foreign Application Priority Data

Mar. 29, 2018  (DE) .................. 10 2018 204 902

(51) Int. Cl.

| | |
|---|---|
| *H04N 7/18* | (2006.01) |
| *G01S 17/86* | (2020.01) |
| *H04N 13/257* | (2018.01) |
| *G01S 17/42* | (2006.01) |
| *H04N 5/225* | (2006.01) |

(Continued)

(52) U.S. Cl.
CPC .............. *G01S 17/86* (2020.01); *B60R 1/00* (2013.01); *G01S 7/497* (2013.01); *G01S 17/10* (2013.01); *G01S 17/42* (2013.01); *G01S 17/46* (2013.01); *G01S 17/89* (2013.01); *H04N 5/2256* (2013.01);

(Continued)

(58) Field of Classification Search
CPC .... H04N 13/257; H04N 5/2256; H04N 7/183; H04N 7/185; H04N 7/18; G01S 17/023; G01S 17/10; G01S 17/42; G01S 17/46; G01S 17/89; G01S 7/497; B60R 11/04; B60R 1/00; B60R 2011/0003
USPC .................. 348/46, 49–51, 135, 140, 148; 340/425.5, 435; 702/149
See application file for complete search history.

(56) References Cited

U.S. PATENT DOCUMENTS 5,680,313 A * 10/1997 Whittaker .......... B60K 31/0008
                                                                      348/135
2007/0181810 A1   8/2007 Tan et al.
2011/0285910 A1   11/2011 Bamji et al.

FOREIGN PATENT DOCUMENTS

| DE | 10 2007 004 609 A1 | 8/2007 |
|---|---|---|
| EP | 1 031 471 A1 | 8/2000 |
| WO | WO 2014/195020 A1 | 12/2014 |

OTHER PUBLICATIONS

Search Report dated Dec. 17, 2018 for German Patent Application No. 10 2018 204 902.5, (12 pp.), note: pp. 1 and 2 are English language Explanations to Section C. Result of Determination Document.

\* cited by examiner

*Primary Examiner* — Sherrie Hsia
(74) *Attorney, Agent, or Firm* — Brinks Gilson & Lione

(57) ABSTRACT

An imaging system for a land vehicle may include an imaging sensor, an evaluation device, and an output interface. The imaging sensor may be configured to acquire first signals and second signals, wherein the first signals are obtained via beam pulses provided by a first emitter and reflected on an object and the second signals are obtained via beam patterns provided by a second emitter and reflected on the objected. The evaluation device may be configured to obtain a first distance measurement based on the first signals and a second distance measurement based on the second (Continued)

signals. The evaluation device may also be configured to obtain a third distance measurement via a comparison of the first distance measurement and the second distance measurement.

20 Claims, 2 Drawing Sheets

(51) Int. Cl.
    *G01S 7/497*     (2006.01)
    *G01S 17/10*     (2020.01)
    *G01S 17/89*     (2020.01)
    *G01S 17/46*     (2006.01)
    *B60R 1/00*     (2006.01)
    *B60R 11/04*     (2006.01)
    *B60R 11/00*     (2006.01)

(52) U.S. Cl.
    CPC ............ *H04N 13/257* (2018.05); *B60R 11/04* (2013.01); *B60R 2011/0003* (2013.01)

FUNCTIONAL SAFETY CONCEPT FOR A 3D INTERIOR OBSERVATION CAMERA

RELATED APPLICATIONS

This application claims the benefit and priority of German Patent Application DE 10 2018 204 902.5, filed Mar. 29, 2018, which is incorporated by reference herein in its entirety.

TECHNICAL FIELD

The present disclosure relates to an imaging sensor for a land vehicle for receiving distance information.

BACKGROUND

Interior cameras for land vehicles are well known from the prior art. Such interior cam-eras provide a two or three-dimensional image and/or a time sequence of such images of the vehicle interior. In particular interior cameras provide such images and/or sequences of images of persons that are arranged in the interior of the land vehicle in particular of a vehicle driver, a front-seat passenger and/or a further passenger. One well known type of interior cameras are so-called time of flight cameras, which, based on a light propagation between the camera and an object, calculate a distance of the object to the camera.

WO 2014/195020 A1 discloses an imaging system with a time of flight imaging sensor, wherein the system is designed to receive an image of a scene, wherein the scene has been illuminated with at least two different illumination sources.

In the automotive sector interior cameras must comply with the specifications of the ISO 26262 standard "Road vehicles—Functional safety" in order to be protected from breakdowns.

The embodiments of the present disclosure address the problem of providing an interior camera for a land vehicle with improved functional security.

BRIEF DESCRIPTION OF THE DRAWINGS

The invention will be described in greater detail on the basis of the following figures. The figures show the following.

DETAILED DESCRIPTION

Figure 1:
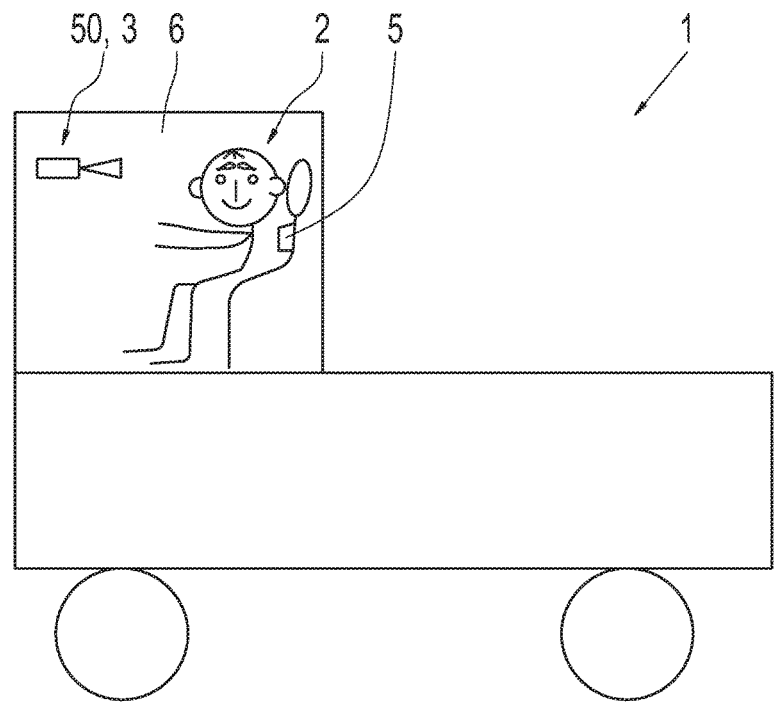
FIG. 1 shows an exemplary embodiment of an interior camera according to the invention in a land vehicle.

The embodiments of the present disclosure address the problem of providing an interior camera for a land vehicle with improved functional security. For example, the problem may be solved by an imaging sensor for a land vehicle for receiving distance information with the features described in this specification.

The imaging sensor according to the invention for a land vehicle for receiving distance information is designed to detect first and second signals. The first signals are reflected beam pulses on objects illuminated with beam pulses of a first emitter. The second signals are reflected beam patterns on objects illuminated with beam patterns of a second emitter. The imaging sensor has an evaluation device. The evaluation device is de-signed to obtain a first distance information of these objects depending on the first signals in a first distance measurement. Further, the evaluation device is designed to obtain a second distance information of these objects depending on the second signals in a second distance measurement. In addition the evaluation device is designed to obtain a third distance information of these objects depending on a comparison of the first and the second distance information. Moreover, the imaging sensor has an output interface, which is designed to provide an image of these objects depending on the third distance information. The imaging sensor is designed such that it is functionally safeguarded by the first and the second distance measurement in the event of a breakdown of one of these distance measurements.

The subsequent definitions apply for the entire subject matter of the invention.

An imaging sensor is a sensor that generates an image from incoming signals, preferably incident light. An imaging sensor of a digital camera generates a two-dimensional image of the recorded scene from the incident light on the sensor.

An emitter is an apparatus that provides beams, for example light, preferably in the form of radiation beams. A radiation beam is a number of beams, wherein the beams are aligned to one other, preferably running approximately parallel to one other. The emitter illuminates objects with the beams. A projector is an emitter.

A beam pulse is a beam that exists in a finite period of time. This time period can be repeated, preferably periodically. Depending on a respective application, the time period ranges from the order of magnitude of nanoseconds to the order of magnitude of attoseconds. A time coded signal that has a time impulse sequence is a beam pulse.

A beam pattern is a geometric form of illumination that is achieved with these beams by means of a corresponding emitter, which generates this pattern. Patterns are for example geometric shapes such as lines or circles, for example. Patterns also means a sequence of such shapes. The patterns are achieved by means of space coding of signals. In English, illumination with beam patterns is referred to as structured lighting.

In particular, light beams in the infrared wavelength range function as beams.

An evaluation device is an apparatus that processes incoming information and outputs a result of this processing. In particular, an evaluation device is an electronic circuit, for example such as a central processor unit or a graphics processor.

The first distance measurement is a propagation time measurement. In the first distance measurement the evaluation device acquires the time the beam pulse requires to reach the object from the first emitter, and the time required to reach the evaluation device from the object as a reflected beam pulse. On the basis of this propagation time the distance of the object to the evaluation device arises as a result with knowledge of the propagation speed of the beam pulse.

The second distance measurement is a geometric measurement and is preferably redundant to the first distance measurement. In the second distance measurement the evaluation device acquires a geometric change of the beam pattern reflected on an object in comparison to the beam pattern sent with the second emitter. Depending on the expansion and distance of the object, patterns of reflected beam patterns appear blurred in comparison to patterns of sent beam patterns. For example, the points of a sent pattern of points appear blurred on a distant curved surface in comparison to a near plane surface. That means, depending on this geometric change the distance to the object is determined.

An interface is a device between at least two function units, at which an exchange of logical parameters, for example data, or physical parameters, for example electrical signals, occurs, either only unidirectionally or bidirectionally. The exchange can be analog or digital. The exchange can occur wirelessly or wired.

The image that is provided by the output interface is a three-dimensional image, in which the objects are presented three-dimensionally. In the process, the distance of the individual object points is preferably presented as a function of gray scales.

In a normal, that is means error-free operation, a component of a system correctly executes a security relevant function. Functional security means that, in the event of a failure of the component, the system is reliably controlled, in particular either by transitioning to a previously defined secure state, or by activation of a further component, which takes over the function the failed component. Systems with functional security have a low probability of failure. Particularly in the automotive sector, different security levels are differentiated, which are distinguished in terms of a recommended or stipulated probability of failure. These levels are called ASIL levels, or Automotive Safety Integrity Levels. ASIL A recommends that fewer than 1000 breakdowns occur within 109 operating hours. ASIL B recommends that fewer than 100 breakdowns occur within 109 operating hours. ASIL C stipulates that fewer than 100 breakdowns occur within 109 operating hours. ASIL D stipulates that fewer than 10 breakdowns occur within 109 operating hours. For example, ASIL D is required for a component executing a function which, in the event of a malfunction leads to severe injuries of the user and makes a survival of the user improbable, wherein the malfunction can always occur, that means has a high probability of occurrence, for example while accelerating, braking or steering, and is difficult to manage.

If the first distance information corresponds with the second distance information, then the third distance information is equal to the first is equal to the second distance information. If an error occurs with the first distance information, that is, if a result of the first distance measurement is zero and a result of the second distance measurement is different from zero, then the third distance information is equal to the second distance information. If an error in the second distance measurement occurs, that is, if the result of the second distance information is 0 and the result of the first distance information is different from 0, then the third distance information is equal to the first distance information. Through this redundancy in the distance measurement, the imaging sensor is functionally safeguarded. Moreover, a result of the first distance measurement can be compared with a result of the second distance measurement to increase the accuracy of the result.

In one preferred embodiment of the invention the imaging sensor is referred to as a time of flight sensor. In the case of a time of flight sensor, every pixel of the sensor collects incident light and simultaneously measures the propagation time that the light requires to go from a source to the object and from the object back to the pixel. Each of the pixels of the time of flight sensors transforms light to an electrical current. The pixel works with several switches and in each case, with a storage element assigned to a switch. In the simplest case, every pixel has two switches and two storage elements. The switches are actuated with the emission of the beam pulse and opened for the time period of the beam pulse, that is, the pulse length. In the process, the control signals of the respective switch are each deferred by a pulse length. If a reflected beam pulse impinges on the pixel with delay, only a part of the beam pulse reaches the first storage element, the other part is gathered in the second storage element. Depending on distance, this changes the ratio of gathered light in the first storage element changes to gathered light in the second storage element. By reading out the pixels and determining the ratio of the signals in the first and in the second storage element, the distance of the acquired object then follows. The function of a time of flight sensor is disclosed for example in WO 2014/195020 A1.

In the case of the subject matter of WO 2014/195020 A1, only one distance measurement is obtained with the light of an illumination source. The light of the second illumination source is used there only to improve the resolution. The advantage of the imaging sensor according to the invention is that with an imaging sensor two distance measurements are executed independently from each other and, on the basis of these distance measurements a resulting distance measurement is always obtained, even in the event of a failure of a distance measurement. That means the imaging sensor is functionally safeguarded against the failure of one of the distance measurements.

In one development of the invention the evaluation device is designed to obtain color image data of these objects and, depending on these color image data and the third distance information to obtain a three-dimensional color image of these objects, wherein the output interface is designed to provide this color image. Thus, in particular a time of flight sensor is provided that supplies a three-dimensional color image with distance information. Moreover two-dimensional image data of a common two-dimensional imaging sensor are compared with the two-dimensional data of the imaging sensor according to the invention to increase the functional security of the imaging sensor.

Advantageously, the evaluation device is designed to perform a comparison of the first and/or second signals with the color image data. This comparison improves the functional security.

Preferably, the imaging sensor is an imaging sensor of an interior camera of the land vehicle and/or the output interface is a human machine interface, preferably in the form of a screen of an infotainment system of the land vehicle. In particular for interior cameras which control the further security relevant apparatuses in a vehicle, depending on the acquired passengers an imaging sensor according to the invention is advantageous. Such interior cameras must namely be functionally safeguarded.

The imaging system for a land vehicle for receiving distance information according to the invention has a first emitter. The first emitter is designed to illuminate objects with beam pulses. The imaging system also has a second emitter. The second emitter is designed to illuminate the objects with beam patterns. Further, the imaging system has an imaging sensor. The imaging sensor is designed to detect first and second signals. In the process, the first signals are beam pulses reflected on the objects illuminated with the beam pulses. The second signals are beam patterns reflected on the objects illuminated with the beam patterns. Moreover, the imaging system has an evaluation device. The evaluation device is designed to obtain a first distance information of the objects depending on the first signals in a first distance measurement. Moreover, the evaluation device is designed to obtain a second distance information of the objects depending on the second signals in a second distance measurement. In addition, the evaluation device is designed to obtain a third distance information of the objects depending on a comparison of the first and second distance measurement. Moreover, the imaging system has an output interface. The output interface is designed to provide an image of these objects depending on the third distance information. The imaging system is designed such that it is functionally safeguarded by the first and second distance measurement in the event of a failure of one of these distance measurements.

With the imaging system a complete system for imaging is provided that has the advantages of the imaging sensor according to the invention.

Preferably, the imaging system has an optical device, which is designed to display beams reflected on these objects on the imaging sensor.

An optical device is an optical system that gathers reflected beams on a surface of an imaging sensor of the imaging system.

Preferably, the optical device has an optical band-pass filter which only allows those wavelengths to pass through with which the illumination also works. Thus, a majority of the disturbing background light is eliminated.

Within the scope of the invention, disturbing background light is also eliminated by means of the first and second signals of the imaging sensor. The disturbing background light appears both in the first signal and in the second signal and can be easily subtracted.

In one preferred embodiment of the invention the imaging sensor and/or the optical device are functionally safeguarded by the first and second distance measurement, and/or preferably by a comparison of the first and/or of the second signals with color images of these objects. Preferably, a failure rate of the imaging system is less than 100 breakdowns per 109 operating hours of the operating system. With this, an ASIL B level is reached for the imaging system.

The color images are obtained with the optical device of the imaging system, so that the imaging system has only one optical path, which is functionally safeguarded according to the invention. The color images can also be obtained with a second optical device.

Preferably the imaging sensor is an imaging sensor according to the invention.

A use of an imaging system according to the invention with an environment detection system, preferably an interior camera, of a land vehicle, is also in accordance with the invention.

An environment detection system is a system that acquires the environment of a vehicle and provides the acquisition to a driver of the land vehicle, in particular within the scope of assisting driving tasks or also in the case of an automated driving operation. Environment detection systems are for example, external cameras with corresponding merging of the collected camera data and an actuation of vehicle actuators depending on said collected camera data.

Advantageously, an imaging sensor of the environment detection system is an imaging sensor according to the invention or an imaging system of the environment detection system is an imaging system according to the invention.

Particularly preferably the environment detection system is an interior camera.

The method for functional safeguarding of an environment detection system of a land vehicle according to the invention has the following steps:

illuminating objects with beam pulses and obtaining beam pulses reflected on the objects, illuminating objects with beam patterns and obtaining beam patterns reflected on the objects, in a first distance measurement, measurement of propagation times of the beam pulses and obtaining a first distance information these objects depending on the propagation times, in a second distance measurement, measurement of reflection patterns of the beam patterns obtaining a second distance information of these objects depending on the reflection patterns, comparison of the first and second distance information and obtaining a third distance information of these objects depending on the comparison, and providing an image of these objects depending on the third distance information, wherein the environment detection system is functionally safeguarded by the first and the second distance measurement in the event of a failure of one of these distance measurements.

Hence, in addition to an apparatus for functional safeguarding, advantageously a corresponding method is also provided.

Preferably, color images of these objects are obtained and these color image data are compared with the beams reflected on these objects to increase the functional security of the environment detection system.

Particularly preferably, an imaging sensor according to the invention or an imaging system according to the invention is used to perform the method.

A computer program product according to the invention is designed to be loaded into a memory of a computer and comprises software code sections, with which the method according to the invention can be executed when the computer program is running in the computer. Preferably, the computer program product is loaded into a memory of the imaging sensor or of the imaging system.

In the following figures identical reference numerals denote identical reference elements. In the corresponding figures, in each case the relevant reference elements are numbered.

FIG. 1 shows a passenger vehicle as a land vehicle 1. In an interior 6 of the land vehicle 1 a passenger is arranged on a driver's seat as an object 2. The passenger is for example the vehicle driver. The passenger can however also be a front-seat passenger. Passengers, e.g. children, can also be on the back seat.

An interior camera 3 is arranged in the interior 6 as an environment detection system 50. The interior camera 3 is designed such that it acquires the entire interior 6. Preferably, for this purpose the interior camera has a wide-angle lens as an optical device 23. The environment detection system 50 can be connected to further advance driver assistance systems and vehicle actuators. In particular, in the process the data gathered by the individual advance driver assistance system are merged with each another. The interior camera 3 acquires the object 2 and an arrangement of a seat belt 5. The interior camera 3 is in particular connected to an airbag controller. For example, if the interior camera 3 detects that the vehicle driver is seated against the driving direction, that is, is arranged with his face and upper body pointing to the back seat against the driving direction, then the interior camera 3 controls the airbag controller for the vehicle driver such that an airbag is not triggered. The interior camera 3 only switches the airbag controller for the vehicle driver to an active state if the interior camera 3 has detected that the vehicle driver is arranged seated in the driving direction.

Figure 2:
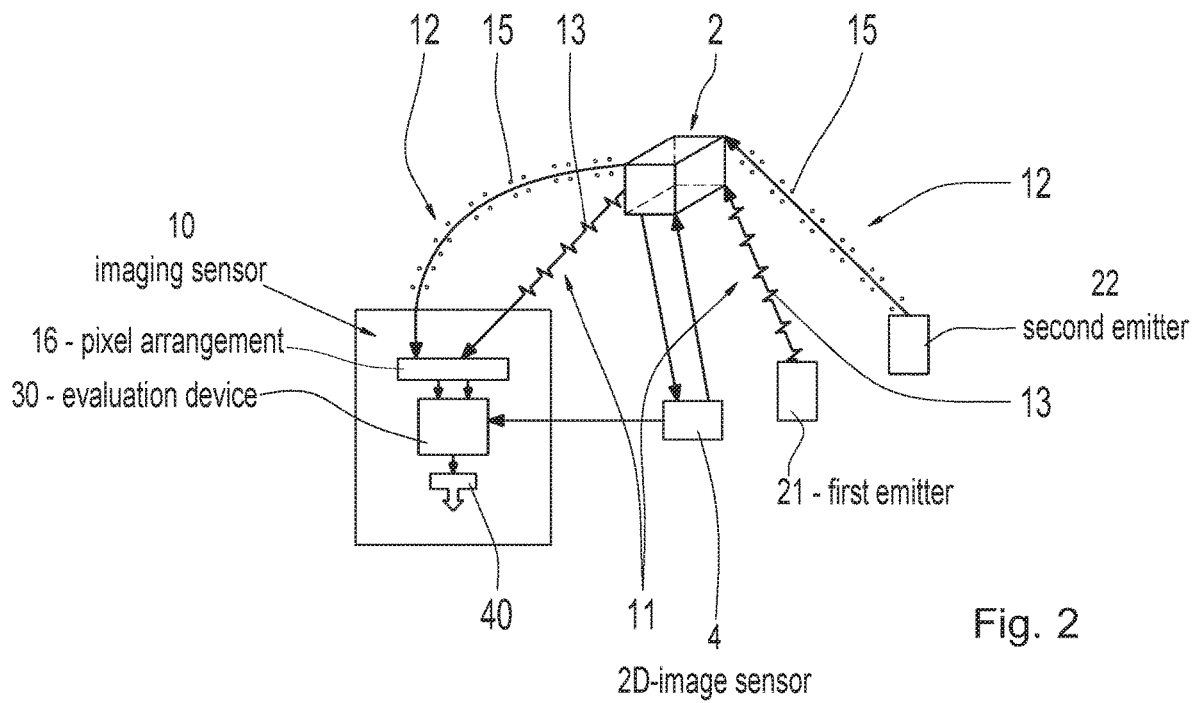
FIG. 2 shows an exemplary embodiment of an imaging sensor according to the invention.

FIG. 2 shows an imaging sensor 10. A pixel arrangement 16 of the imaging sensor 10 receives first signals 11 and second signals 12 reflected on the object 2. The object 2 is illuminated with beam pulses 13 of a first emitter 21. Moreover, the object 2 is illuminated with beam patterns 15 of a second emitter 22. A single beam pulse of the beam pulses 13 has a duration of preferably below 50 ns, in particular a duration of 10 ns. The beam pattern 15 is an arrangement of light points. The pixel arrangement 16 is a two-dimensional arrangement of pixels. The imaging sensor 10 has for example a quadratic shape with an edge length of 45 μm. In the process, the pixel arrangement 16 preferably has 200×200 pixels.

From the signals obtained with the pixel arrangement 16 an evaluation device 30 in a first distance measurement obtains a first distance information of the illuminated object 2. The first distance measurement is a measurement of propagation times of the beam pulses 13. In the first distance measurement a distance information of these objects is obtained depending on the propagation times.

In a second distance measurement the evaluation device obtains a second distance information of the illuminated object 2. The second distance measurement H measures reflection patterns of the beam patterns 15 and obtains a second distance information of the illuminated object depending on the reflection patterns. In addition, the signals, which the evaluation device 30 receives from the pixel arrangement 16, are merged with signals of a 2D-imaging sensor 4. The 2D-imaging sensor 2 is a high resolution two-dimensional imaging sensor. The evaluation device 30 thus merges the signals that are obtained with the pixel arrangement 16, with color image data of the 2D-imaging sensor 14 and obtains a high resolution three-dimensional image with color information. Depending on the third distance information, which the evaluation device 30 obtains from a comparison of the first distance information with the second distance information, this image is provided via an output interface 40.

The 2D-imaging sensor 14 preferably has the same optical device 23 as the imaging system 20, thus is arranged in the optical path of the imaging sensor 10. Alternatively, the 2D-imaging sensor 14 has its own optical device 23.

The output interface 40 is a human machine interface in the form of a screen of an infotainment system of the land vehicle.

Figure 3:
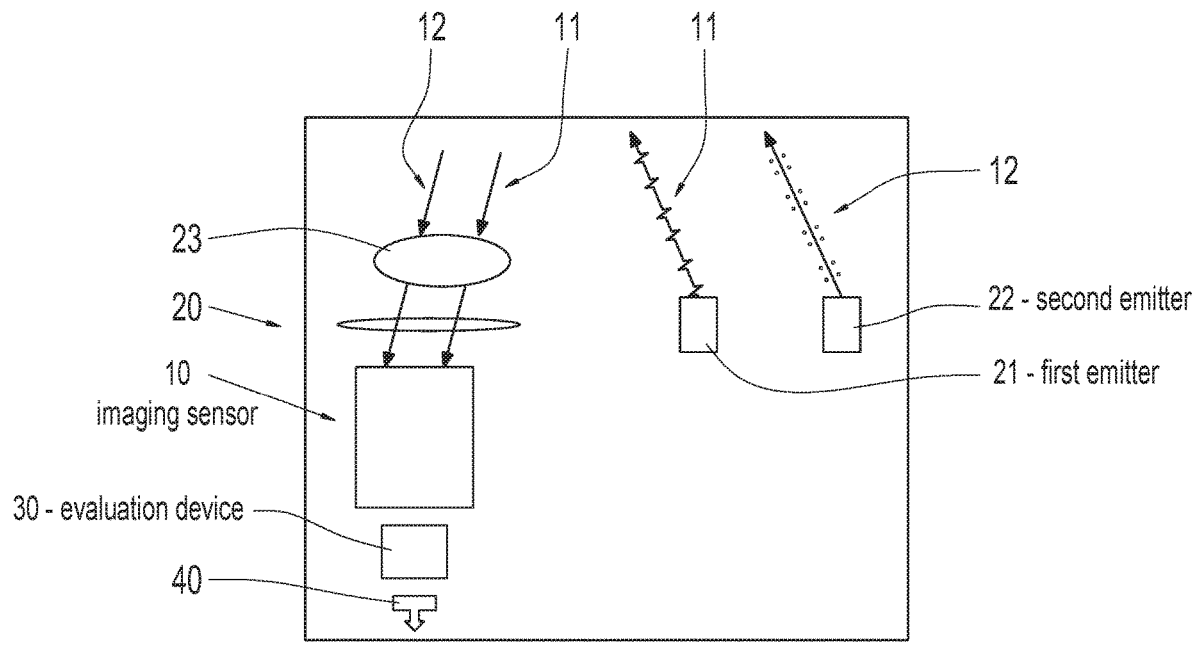
FIG. 3 shows an exemplary embodiment of an imaging system according to the invention.

FIG. 3 shows an imaging system 20. The imaging system 20 has a first emitter 21 and a second emitter 22. The first emitter 21 illuminates objects with first signals 11. The first signals 11 are beam pulses with a specified pulse length. The second emitter 22 illuminates objects 2 with beam patterns by means of a second signal 12.

The imaging system 20 has in addition an optical device 23. The optical device 23 is a system of optical convergent and divergent lenses.

Further, the imaging system has 20 an evaluation device 30 and an output interface 40. The imaging sensor 10 is preferably an imaging sensor according to the invention 10. The output interface 40 provides an image of the object 2 depending on the third distance information obtained with the evaluation device 30 of the distance information from a comparison of the first distance information with the second distance information.

Figure 4:
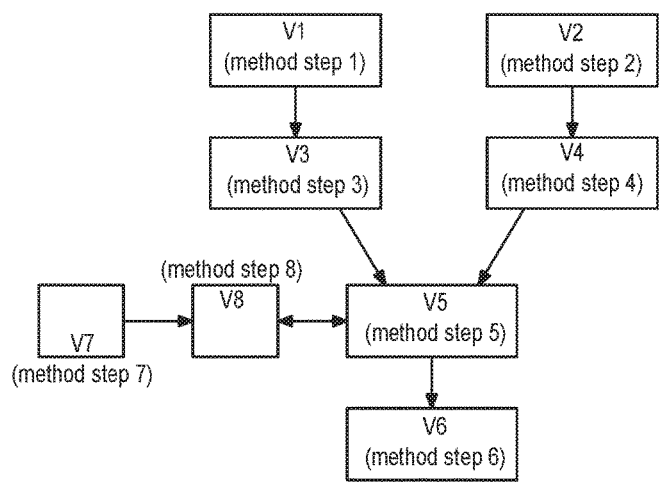
FIG. 4 shows a schematic representation the invention according to the method.

FIG. 4 shows a method for the functional safeguarding of an environment detection system 50. In the process, objects 2 are illuminated with beam pulses 13 in a first step V1. Beam pulses 13 reflected on the objects 2 are obtained. In a second step V2 the objects 2 are illuminated with beam patterns 15. Beam patterns 15 reflected on the objects are obtained. Steps V1 and V2 occur successively or in parallel in terms of time. In a first distance measurement, propagation times of the beam pulses are measured and in a step V3 a first distance information of the object 2 is obtained depending on the propagation times. In a second distance measurement, reflection patterns of the beam patterns are measured and in a step V4 a second distance information of the object 2 is obtained depending on the reflection patterns. In a step V5 the first and the second distance information items are compared to each other and, depending on the comparison, a third distance information of the object 2 is obtained. Depending on the third distance information, an image of the object 2 is provided in step V6. Parallel to the comparison of the first and second distance information, in a step V7 color images of the objects 2 are obtained. These color images are compared with the beams reflected on the objects 2 in a step V8.

For the functional security of the environment detection system 50 the data of the 2D-imaging sensor are compared with the two-dimensional image information of the imaging sensor 10. The imaging sensor 10 is preferably a time of flight sensor.

I claim:

1. An imaging system for a land vehicle, comprising:
   an imaging sensor;
   an evaluation device; and
   an output interface,
   wherein the imaging sensor is configured to acquire first signals and second signals, wherein the first signals are obtained via beam pulses provided by a first emitter and reflected on an object and the second signals are obtained via beam patterns provided by a second emitter and reflected on the object,
   wherein the evaluation device is configured to obtain a first distance measurement based on the first signals and a second distance measurement based on the second signals,
   wherein the evaluation device is configured to obtain a third distance measurement via a comparison of the first distance measurement and the second distance measurement,
   wherein the output interface is configured to form an image of the object based on the third distance measurement, and
   wherein the imaging sensor is configured such that it is functionally safeguarded by the first distance measurement and the second distance measurement in the event of a failure of at least one of the first distance measurement and the second distance measurement.

2. The imaging system according to claim 1, where the imaging sensor is a time of flight method sensor.

3. The imaging system according to claim 1, where the evaluation device is configured to obtain color image data of the object and to obtain a three-dimensional color image of the object based on the color image data and the third distance measurement, and wherein the output interface is configured to display this color image.

4. The imaging system according to claim 3, where the evaluation device is configured to perform a comparison of the first signals and the second signals with the color image data.

5. The imaging system according to any of claim 1, where the imaging sensor includes a camera within an interior of the land vehicle.

6. The imaging system according to claim 1, wherein the output interface includes a human machine interface with a screen located in the interior of the land vehicle.

7. An imaging system for a land vehicle, comprising:
a first emitter, which is configured to illuminate an object with beam pulses,
a second emitter, which is configured to illuminate the object with beam patterns,
an imaging sensor, which is configured to acquire first signals based on the beam pulses when they are reflected on the object,
wherein the imaging sensor is configured to acquire second signals based on the beam patterns when they are reflected on the object;
an evaluation device,
wherein the evaluation device is configured to obtain a first distance a first distance measurement based on the first signals and a second distance measurement based on the second signals, and
wherein the evaluation device is configured to obtain a third distance measurement based on a comparison of the first distance measurement and the second distance measurement; and
an output interface,
wherein the output interface is configured to form an image of the object based on the third distance information, and
wherein the imaging system is configured such that it is functionally safeguarded by the first distance measurement and the second distance measurement in the event of a failure of one of the first distance measurement and the second distance measurement.

8. The imaging system according to claim 7, where the imaging system includes an optical device which is configured to display beams reflected on the object on the imaging sensor.

9. The imaging system according to claim 8, where the imaging sensor is functionally safeguarded by at least one of the first and the second distance measurements.

10. The imaging system according to claim 8, where the optical device is functionally safeguarded by at least one of the first and the second distance measurements.

11. The imaging system according to claim 7, wherein a failure rate of the imaging system is less than 100 breakdowns per 109 operating hours of the imaging system.

12. The imaging system according to claim 7, wherein at least a portion of the imaging system is located in an interior of the land vehicle.

13. The imaging system according to claim 7, where the imaging sensor is a time of flight method sensor.

14. The imaging system according to claim 7, where the evaluation device is configured to obtain color image data of the object and to obtain a three-dimensional color image of the object based on the color image data and the third distance information, and wherein the output interface is configured to display this color image.

15. The imaging system according to claim 14, where the evaluation device is configured to perform a comparison of the first signals and the second signals with the color image data.

16. The imaging system according to claim 7, where the imaging sensor includes a camera within the interior of the land vehicle.

17. The imaging system according to claim 7, wherein the output interface includes a human machine interface with a screen located in the interior of the land vehicle.

18. A method for functional safeguarding an environment detection system of a land vehicle, the method comprising:
illuminating an object with beam pulses and obtaining beam pulses reflected from the object;
illuminating the object with beam patterns and obtaining beam patterns reflected from the object;
measuring the propagation times of the beam pulses to obtain a first distance measurement;
measuring reflection patterns of the beam patterns to obtain a second distance measurement;
comparing the first distance measurement and the second distance measurement to obtain a third distance measurement based on the comparison; and
forming an image of the object based on the third distance measurement.

19. The method according to claim 18, further comprising color image data of the object, wherein the color image data is compared with the beams reflected on the object to increase the functional security of the environment detection system.

20. The method according to claim 18, wherein an imaging sensor is included for detecting the beam pulses and the beam patters, the imaging sensor including a camera.

* * * * *